(No Model.)
C. S. HARPER.
TWO WHEELED VEHICLE.
No. 297,599. Patented Apr. 29, 1884.
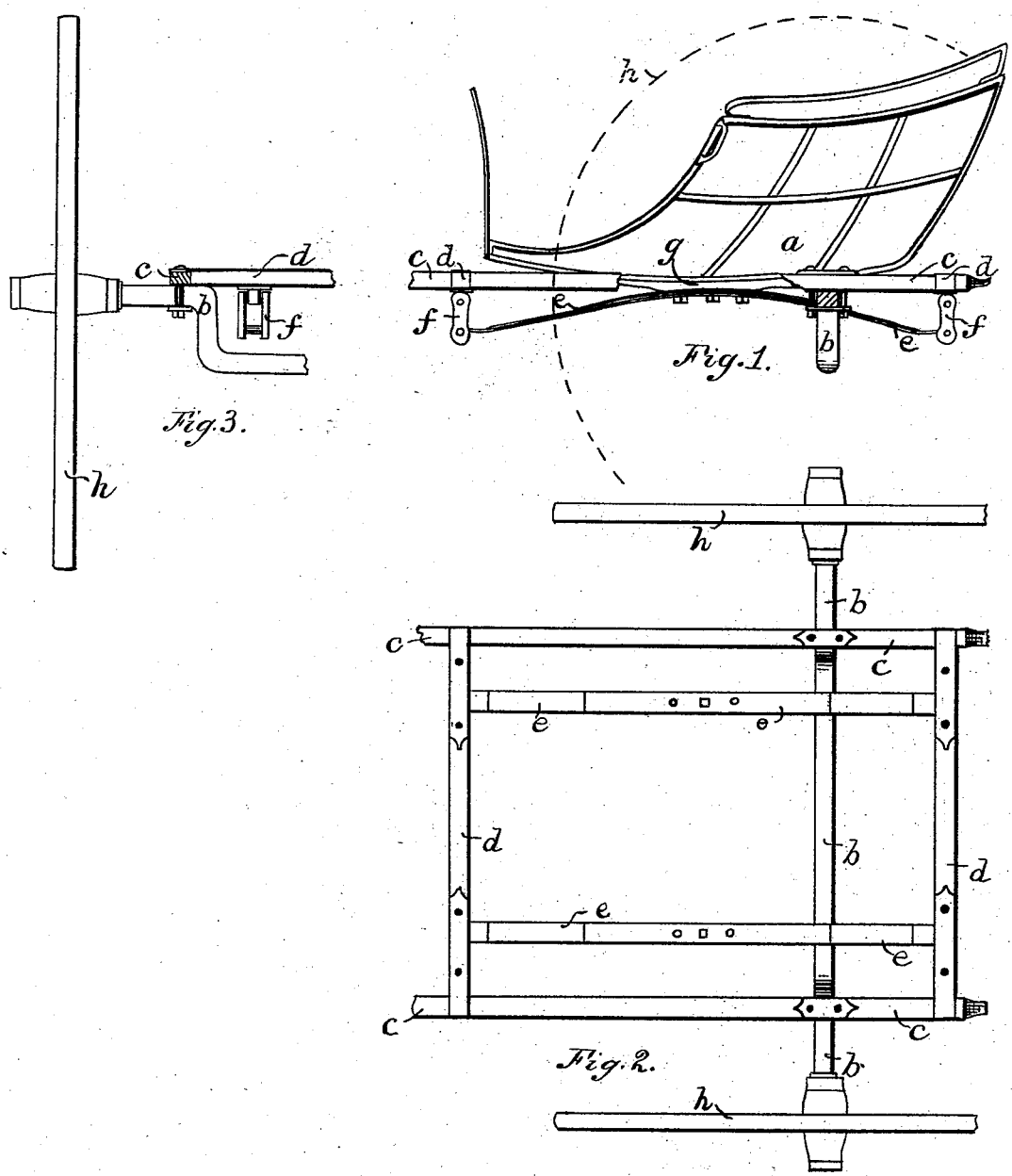

UNITED STATES PATENT OFFICE.

CHARLES S. HARPER, OF SHARON, MASSACHUSETTS.

TWO-WHEELED VEHICLE.

SPECIFICATION forming part of Letters Patent No. 297,599, dated April 29, 1884.

Application filed April 27, 1883. (No model.)

*To all whom it may concern:*

Be it known that I, CHARLES S. HARPER, of Sharon, in the county of Norfolk and State of Massachusetts, have invented a new and useful Improvement in Two-Wheeled Vehicles, which will, in connection with the accompanying drawings, be hereinafter fully described, and specifically defined in the appended claim.

This invention relates to that class of pleasure-carriages known as "two-wheeled vehicles;" and it consists in the construction and combination of the divers devices embodied therein, as hereinafter more particularly and fully set forth and claimed.

In the accompanying drawings, Figure 1 is a side elevation of a carriage embodying my invention, the front portion of the shaft being broken away for want of space, and a portion opposite the body being also broken away to show the connection of the body and springs, the axle being shown in transverse section and the wheel by a dotted line. Fig. 2 is a top or plan view of the vehicle shown in Fig. 1, except that the body is omitted. Fig. 3 is a detached front elevation showing one wheel and a section of the axle united, the shaft in section, and one cross-bar and a spring-link in elevation.

In said views, $a$ represents the body, which may be of any desired style and form. $b$ is the axle, which is "cranked," as shown, when high wheels and a low-hung body are required; and when low wheels are employed, with a body medium or high hung, the axle can be straight, and a bolster or riser be interposed between the shaft and axle, in the well-known manner. The shafts $c\ c$ are shown as bolted and yoked to the axle between the throw of the crank and the hub of wheel $h$. Said shafts are united by cross-bars $d\ d$, which are arranged from each other a distance equal to the length of springs $e$, and at such relative distance from axle $b$ that when the occupants of body $a$ are seated therein the vehicle will balance properly upon the axle. Said springs $e$ are at their ends pivotally suspended beneath cross-bars $d$ by links $f$, the parts being so proportioned that said links shall hang vertical, or nearly so, and so as not to exert any tensile strain upon the springs, as is always done in four-wheeled side-spring vehicles. Body $a$ is seated upon spring-block $g$, which latter is at its center portion fitted to the spring in the well-known manner as shown in Fig. 1. By my arrangement of the several parts the body is cushioned by the elasticity of shafts $c$, cross-bars $d$, and springs $e$, and the free motion of the body resulting from its peculiar suspension allows the requisite yielding action to neutralize the otherwise disturbing and monotonous motion which results from the action of the horse.

I claim as my invention—

The combination of axle $b$, shafts $c$, cross-bars $d\ d$, springs $e\ e$, and links $f$, said cross-bars and springs being arranged relatively to the axle to give the required balance to body $a$ over the axle, and said springs and cross-bars being so relatively arranged that the springs shall be freely suspended in links $f$ beneath said cross-bars, substantially as specified.

CHARLES S. HARPER.

Witnesses:
T. W. PORTER,
EUGENE HUMPHREY.